United States Patent
Lee et al.

(10) Patent No.: US 9,937,804 B2
(45) Date of Patent: Apr. 10, 2018

(54) CHARGING DEVICE FOR ECO-FRIENDLY VEHICLE AND CONTROL METHOD OF THE SAME

(71) Applicant: Hyundai Motor Company, Seoul (KR)

(72) Inventors: Sang Kyu Lee, Yongin-si (KR); Jae Hwa Jeon, Hwaseong-si (KR); Jeong Bin Yim, Anyang-si (KR); Dae Woong Han, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 188 days.

(21) Appl. No.: 14/959,982

(22) Filed: Dec. 4, 2015

(65) Prior Publication Data

US 2017/0043669 A1 Feb. 16, 2017

(30) Foreign Application Priority Data

Aug. 12, 2015 (KR) ........................ 10-2015-0113664

(51) Int. Cl.
| | |
|---|---|
| B60L 11/00 | (2006.01) |
| H02M 1/36 | (2007.01) |
| H02M 1/42 | (2007.01) |
| B60L 11/18 | (2006.01) |
| H02M 3/04 | (2006.01) |
| H02M 7/04 | (2006.01) |
| H02M 1/00 | (2006.01) |

(52) U.S. Cl.
CPC ........... *B60L 11/1811* (2013.01); *B60L 11/00* (2013.01); *B60L 11/1816* (2013.01); *H02M 1/36* (2013.01); *H02M 1/42* (2013.01); *H02M 3/04* (2013.01); *H02M 7/04* (2013.01); *H02M 2001/007* (2013.01); *H02M 2001/0048* (2013.01)

(58) Field of Classification Search
CPC ... B60L 11/1811; B60L 11/00; B60L 11/1816; B60L 2230/34; B60L 11/1838; B60L 2230/00; H02M 1/36; H02M 1/42; H02M 3/04; H02M 7/04; H02M 2001/0048; H02M 2001/007; Y02T 90/166; Y02T 90/165; Y02T 90/164; Y02T 90/125; H02J 7/0027; H02J 7/0021; H02J 7/0026
See application file for complete search history.

(56) References Cited

U.S. PATENT DOCUMENTS

| | | | | |
|---|---|---|---|---|
| 5,838,077 | A * | 11/1998 | Chelcun ................... | H01H 9/56 307/125 |
| 2014/0002003 | A1* | 1/2014 | Kim ......................... | H02J 7/00 320/103 |
| 2016/0226238 | A1* | 8/2016 | Matsushita ............ | H02H 9/001 |

FOREIGN PATENT DOCUMENTS

| | | |
|---|---|---|
| JP | 5-145435 A | 6/1993 |
| JP | 2009-165322 A | 7/2009 |
| JP | 2012-019673 A | 1/2012 |
| KR | 10-2012-0007663 A | 1/2012 |
| KR | 10-2013-0090678 A | 8/2013 |

(Continued)

*Primary Examiner* — Drew A Dunn
*Assistant Examiner* — Sailesh Thapa
(74) *Attorney, Agent, or Firm* — McDermott Will & Emery LLP

(57) ABSTRACT

A charging device for an eco-friendly vehicle includes a charger having an electronic switching element which reduces an excessive current instantaneously flowing when an external AC power source outside the vehicle is connected to the charger; and a controller configured to control an operation of the electronic switching element.

16 Claims, 4 Drawing Sheets

(56) References Cited

FOREIGN PATENT DOCUMENTS

KR 10-2014-0003201 A 1/2014
KR 10-1489226 B1 2/2015

* cited by examiner

- Related Art -

- Related Art -

CHARGING DEVICE FOR ECO-FRIENDLY VEHICLE AND CONTROL METHOD OF THE SAME

CROSS-REFERENCE TO RELATED APPLICATION

This application claims under 35 U.S.C. § 119(a) the benefit of priority to Korean Patent Application No. 10-2015-0113664 filed on Aug. 12, 2015, the entire content of which is incorporated herein by reference.

TECHNICAL FIELD

The present disclosure relates to a charging device for an eco-friendly vehicle and a control method of the same. More particularly, the present disclosure relates to a charging device for an eco-friendly vehicle and a control method of the same, which can reduce an inrush current generated when an AC power outside the vehicle is connected to a charger in the vehicle and improve efficiency of the charger in the vehicle.

BACKGROUND

In general, an eco-friendly vehicle such as an electric vehicle (EV) or a plug-in hybrid electric vehicle (PHEV), which uses an electric motor as a drive source for driving the vehicle, has a high-voltage battery for supplying electricity to the motor. The high-voltage battery is rapidly charged through a rapid charger or charged by being connected to a general external AC power source through an on-board charger (OBC) mounted in the vehicle.

If external AC power is applied to the vehicle, the OBC converts the AC power into rechargeable DC power, thereby charging the high-voltage battery.

FIG. 1 is a schematic view showing a configuration of an OBC of an eco-friendly vehicle. FIG. 2 is a graph showing an AC voltage and an AC current for illustrating an initial operation of the OBC.

As shown in FIG. 1, an OBC 3 includes an input filter 4, a power connector 5, a rectifier 6, a power factor corrector circuit (PFC) 7, and a DC/DC converter 8. These components are controlled through a controller (not shown) mounted in the vehicle.

The power connector 5 is provided between the input filter 4 connected to external AC power 1 to filter and eliminate noise of the AC power 1 and the rectifier 6 for rectifying AC power, thereby reducing an inrush current instantaneously flowing when the AC power 1 in which noise is eliminated is applied from the input filter 4 and reducing voltage loss after the AC power is connected.

Specifically, the power connector 5 includes a resistance element for reducing an inrush current (a phenomenon in which a large amount of current instantaneously flows when AC power is first applied) flowing at a point of time when the AC power 1 is applied to protect internal elements of the OBC 3, and a relay for reducing voltage loss after the AC power 1 is connected to the OBC.

An initial operation of the OBC 3 including the power connector 5 will be described with reference to FIG. 2. If the AC power 1 is applied to an input terminal of the OBC 3, an inrush current instantaneously introduced with a large value is generated while a current for charging a capacitor inside the OBC 3 is introduced at a point of time when the AC power is applied. The current introduced into the OBC 3 flows through the resistance element of the power connector 5, and the relay is connected after the capacitor is sufficiently charged (charged within a few ms). After the relay is connected as described above, the charging of a high-voltage battery 2 is started.

As known in the art, the PFC 7 performs power factor correction, and the DC/DC converter 8 boosts an output voltage of the PFC 7 to a DC voltage for charging the high-voltage battery 2.

However, as the power connector 5 of the OBC 3 includes the resistance element through which an initial charging current including the inrush current flows before the charging of the high-voltage battery 2 starts, and the relay through which a current not including the inrush current flows by the relay being connected when the charging of the high-voltage battery 2 starts, the volume of the OBC increases, and therefore, it is inadequate to increase the output density of the OBC, which is disadvantageous in packaging.

Since the efficiency of the OBC and the fuel efficiency of the eco-friendly vehicle have a relationship of one to one (the fuel efficiency is increased by 1% when the efficiency is increased by 1%), it is required to maximize the efficiency of the OBC. However, the efficiency of the OBC is reduced due to excessive power consumed in operating a mechanical relay and efficiency reduced by contact resistance when the relay is connected.

Since the relay of the power connector 5 is weak against heat dissipation, additional components (e.g., a thermal pad, a heat pipe, etc.) are required to prevent an increase in temperature, and therefore, an increase in cost is caused.

SUMMARY OF THE DISCLOSURE

The present disclosure provides a charging device for an eco-friendly vehicle and a control method of the same, which can reduce an excessive inrush current instantaneously flowing at a point of time when AC power is applied and prevent excessive power consumption and efficiency degradation caused by a relay of the existing power connector.

According to an embodiment of the present disclosure, a charging device for an eco-friendly vehicle includes a charger having an electronic switching element which reduces an excessive current instantaneously flowing when an external AC power source outside the vehicle is connected to the charger; and a controller configured to control an operation of the electronic switching element.

The controller may previously divide an AC voltage applied to the charger from the AC power source into two or more voltage sections, and control the operation of the electronic switching element by considering a voltage section to which an AC voltage monitored in real time belongs.

The controller may monitor an AC voltage applied to the charger from the AC power source when the external AC power source is connected to the charger by dividing the AC voltage into previously set low, intermediate, and high voltage sections. When the monitored AC voltage belongs to the low voltage section having a voltage smaller than those of the intermediate and high voltage sections, the controller may turn on the electronic switching element by applying a gate voltage for allowing current to flow in the electronic switching element at a point of time when the AC voltage becomes '0.'

When the monitored AC voltage belongs to the low voltage section, the controller applies a gate voltage for allowing current to flow in the electronic switching element in the form of a square wave for a predetermined time, thereby repeatedly turning on/off the electronic switching element for a predetermined time or applying the gate voltage for allowing current to flow in the electronic switching element while increasing the gate voltage at a predetermined rate/rate of change.

The controller may monitor an AC voltage applied to the charger from the AC power source when the external AC power is connected to the charger by dividing the AC voltage into previously set low, intermediate, and high voltage sections. When the monitored AC voltage belongs to the intermediate voltage section having a voltage greater than that of the low voltage section and smaller than that of the high voltage section, the controller may repeatedly turn on/off the electronic switching element for a predetermined time or repeatedly turn on/off the electronic switching element for a predetermined time and then control the electronic switching element to be in an always-on state.

When the monitored AC voltage belongs to the intermediate voltage section, the controller may apply a gate voltage for allowing current to flow in the electronic switching element while increasing the gate voltage at a predetermined rate/rate of change.

The controller may monitor an AC voltage applied to the charger from the AC power source when the external AC power is connected to the charger by dividing the AC voltage into previously set low, intermediate, and high voltage sections. When the monitored AC voltage belongs to the high voltage section having a voltage greater than those of the low and intermediate voltage sections, the controller may apply a gate voltage for allowing current to flow in the electronic switching element while increasing the gate voltage at a predetermined rate/rate of change.

When the monitored AC voltage belongs to the high voltage section, the controller may repeatedly turn on/off the electronic switching element for a predetermined time.

According to another embodiment in the present disclosure, a method of controlling a charging device for charging a battery of an eco-friendly vehicle includes determining whether an external AC power source is connected to a charger of the vehicle, which includes an electronic switching element for reducing an excessive current instantaneously flowing when the AC power source is connected to the charger; monitoring an AC voltage applied to the charger from the AC power source; and monitoring the AC voltage applied from the AC power source by the AC voltage into two or more voltage sections, and controlling an operation of the electronic switching element by considering a voltage section to which the monitored AC voltage belongs.

Other aspects and exemplary embodiments of the invention are discussed infra.

In the charging device for the eco-friendly vehicle and the method of controlling the same according to the present disclosure, resistance element of the existing power connector for reducing an inrush current is removable, so that it is possible to reduce the volume of the power connector as compared with the existing power connector. As an electronic switching element is used rather than a mechanical relay, it is possible to reduce power consumption, etc.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present disclosure, and wherein.

Figure 1:
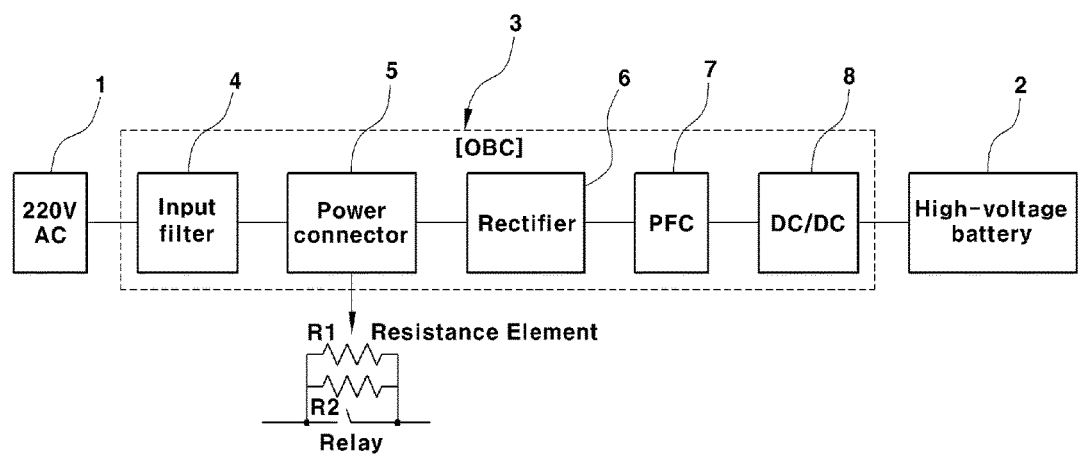
FIG. 1 is a schematic view showing a configuration of an on-board charger (OBC) for an eco-friendly vehicle according to the related art.
Figure 2:
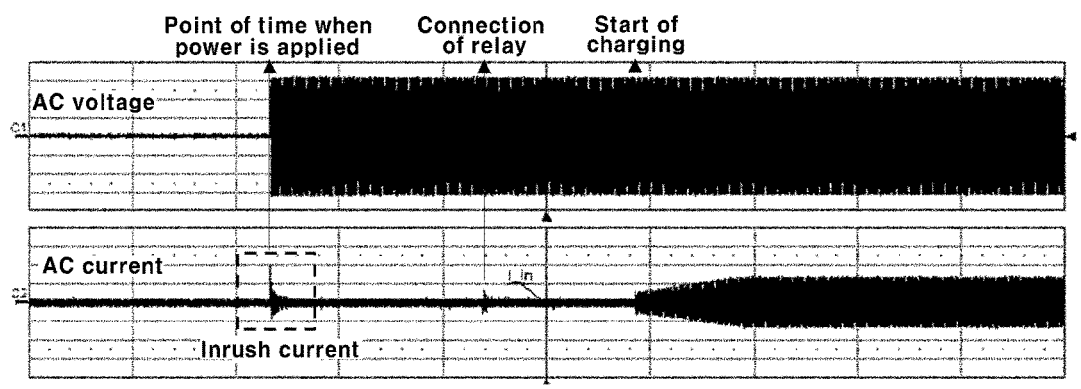
FIG. 2 is a graph showing an AC voltage and an AC current for illustrating an initial operation of the OBC according to the related art.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments in the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 3:
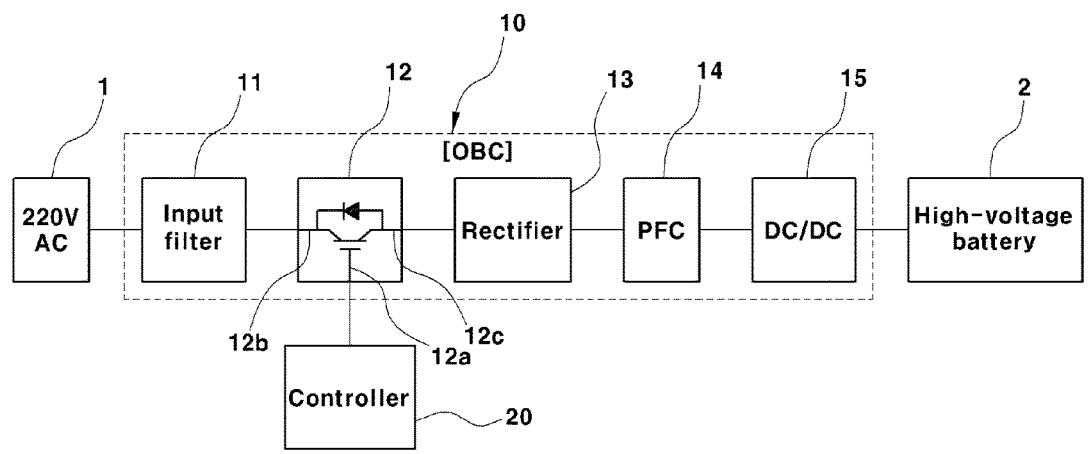
FIG. 3 is a configuration view showing a charging device for an eco-friendly vehicle according to an embodiment in the present disclosure.

As shown in FIG. 3, a charging device for an eco-friendly vehicle according to an embodiment in the present disclosure includes a vehicle mounted type charger 10 connected to an AC power source 1 outside the vehicle so as to charge a battery 2 of the vehicle and a controller 20 for controlling each component of the charger 10.

The charger 10 charges the battery 2 mounted in the vehicle by converting AC voltage/power applied from the external AC power source 1 into DC voltage/power. The charger 10 includes a rectifier 13 for rectifying an AC voltage and outputting the rectified voltage. A power factor corrector circuit (PFC) 14 performs power factor correction of an input voltage/current of the charger 10. A DC/DC converter 15 boosts and outputs an output voltage of the PFC 14 to be rechargeable in the battery 2. A power connector (or electronic switching element) 12 is connected between the AC power source 1 and the rectifier 13. The charger 10 includes an input filter 11 for filtering noise of the AC voltage input from the AC power source 1.

The power connector 12 reduces and outputs an inrush current input from the AC power source 1. The power connector 12 includes an electronic switching element controlled by the controller 20.

An inrush current as an excessive current instantaneously introduced when the AC voltage/power input from the AC power source 1 is applied flows in the charger 10. The inrush current is reduced in the electronic switching element 12 connected to an input terminal of the rectifier 13.

A metal oxide silicon field effect transistor (MOSFET), etc. may be used as the electronic switching element 12. As shown in FIG. 3, one of a source 12b and a drain 12c of the MOSFET is connected to an output terminal of the input filter 11, and the other of the source 12b and drain 12c of the MOSFET is connected to the input terminal of the rectifier 13. As a voltage/current equal to or greater than a critical value is applied to a gate 12a of the MOSFET, a current flows between the source 12b and drain 12c, so that the MOSFET is operated in an on state.

The electronic switching element 12, i.e., the MOSFET can control operation by controlling the voltage/current applied to the gate 12a.

Figure 4:
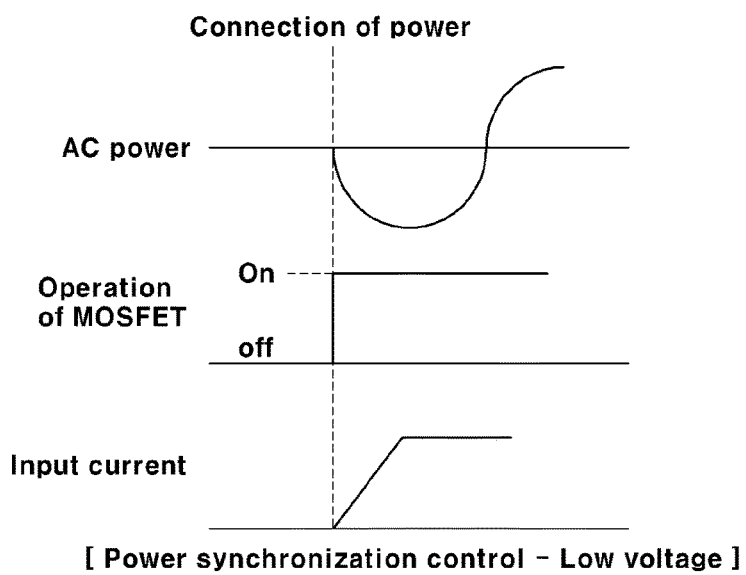
FIGS. 4 to 6 are views illustrating a method of controlling an operation of an electronic switching element in an OBC for connecting power to the charging device according to an embodiment in the present disclosure.
Figure 5:
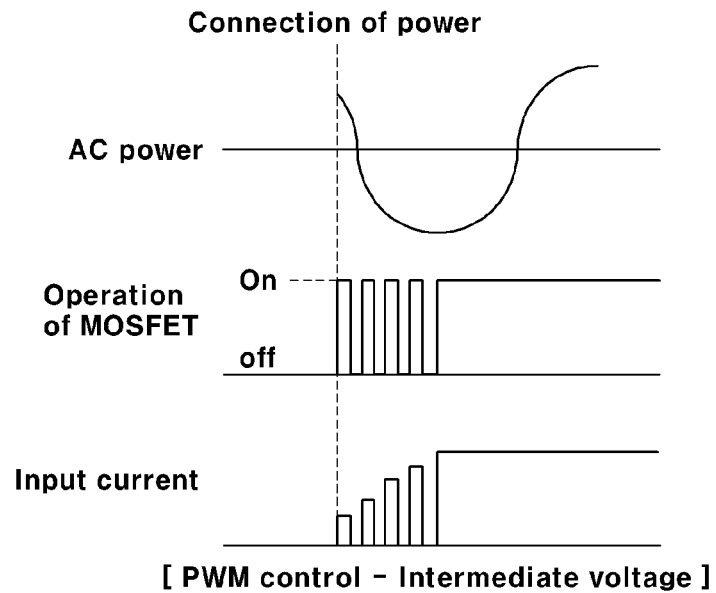
Figure 6:
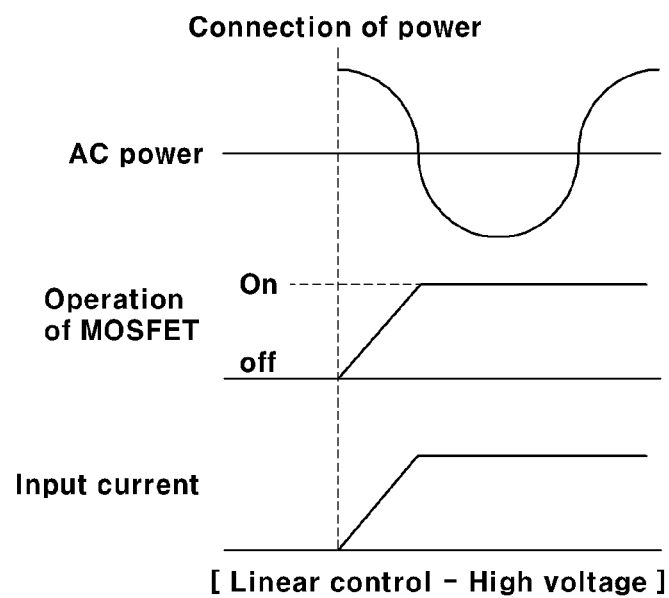

The controller 20 for controlling the operation of the electronic switching element 12 monitors, in real time, an AC voltage input/applied to the charger 10 by dividing the AC voltage into two or more voltage sections, and changes (differentiates), as shown in FIGS. 4 to 6, operation control of the electronic switching element 12 for each voltage section to which the real-time monitored AC voltage belongs, thereby reducing the inrush current introduced into the charger 10.

The controller 20 recognizes an AC voltage applied (input) when AC power is connected to the charger 10 by dividing the AC voltage into previously set low, intermediate, and high voltage sections.

The low, intermediate, and high voltage sections may be set to maximize the reduction efficiency of the inrush current introduced into the charger 10.

Referring to FIG. 4, the controller 20 recognizes an AC voltage monitored in real time when the AC power source 1 is connected (applied) to the charger 10 by dividing the AC voltage for each section based on the magnitude of the AC voltage. When the recognized AC voltage belongs to (is included in) a low voltage section having a voltage relatively smaller than those of the intermediate and high voltage sections, the controller 20 reduces the inrush current introduced into the charger 10 by turning on the electronic switching element 12 at a point of time when the AC voltage input in the form of a sinusoidal wave to synchronize the operation of the electronic switching element 12 with the AC power source 1 becomes 0 V.

When the controller 20 turns on the electronic switching element 12 by applying a gate voltage for opening a channel between the source 12b and the drain 12c (i.e., for allowing current to flow in the electronic switching element 12) to the gate of the electronic switching element 12 at a point of time when the AC voltage applied from the AC power source 1 is '0.' Since the application of input current input to the electronic switching element 12 starts at the point of time when the AC voltage is 0 V, the input current gradually increases in proportion to the AC voltage. After the input current reaches a maximum value, the input current is maintained as the maximum value.

Referring to FIG. 5, when the AC voltage monitored in real time when the AC power 1 is applied (connected) to the charger 10 belongs to (is included in) the intermediate voltage section having a voltage greater than that of the low voltage section and smaller than that of the high voltage section, the controller 20 reduces the inrush current instantaneously introduced into the charger 10 by turning on/off the electronic switching element 12 in a high-speed switching manner through pulse width modulation (PWM) control.

The controller 20 operates the electronic switching element 12 to be repeatedly turned on/off at high speed by applying a gate voltage for operating the electronic switching element 12 (or allowing current to flow in the electronic switching element) in the form of a square wave for a certain time at the point of time when the AC power source 1 is applied. Accordingly, the input current input to the electronic switching element 12 is applied in the form of a square wave where the magnitude of the input current gradually increases. After the charging of a capacitor constituting a circuit (e.g., a circuit of the rectifier, the PFC, the DC/DC converter, etc.) in the charger 10 is completed (i.e., if the input current of the electronic switching element 12 reaches the maximum value), the controller 20 operates the electronic switching element 12 to be in the always-on state by always applying the gate voltage.

The controller 20 includes an ordinary PWM driving circuit (not shown) for performing opening/closing control of a gate channel (i.e., a channel through which current applied to the gate flows) of the electronic switching element 12 in a PWM manner.

Referring to FIG. 6, when the AC voltage monitored in real time when the AC power source 1 is applied (connected) to the charger 10 belongs to (is included in) the high voltage section having a voltage greater than those of the low and intermediate voltage sections, the controller 20 reduces the inrush current by gradually turning on the electronic switching element 12 in a linear control manner.

When it is determined that the AC voltage of the AC power 1 belongs to the high voltage section at the point of time when the AC power source 1 is connected to the charger 10, the controller 20 opens the channel between the source and drain of the electronic switching element 12 at the point of time when the AC voltage of the AC power source 1 has the maximum value. The controller 20 gradually increases the amount of opening of the channel by gradually opening the channel for a certain time (e.g., while the AC voltage decreases from the maximum value to the minimum value), so that the amount of input current flowing through the channel linearly increases.

That is, the channel for allowing current to flow in the electronic switching element 12 is not opened at a time but gradually opened, thereby linearly increasing the amount of opening of the channel.

The controller 20 controls the gate voltage applied to the gate of the switching element 12 to increase at a certain rate/rate of change, thereby gradually increasing the amount of opening of the channel between the source and the drain. Thus, it is possible to reduce the inrush current input to the charger 10.

Accordingly, when the state of the electronic switching element 12 is switched from the off state to the on state, the input current applied from the AC power source 1 linearly increases from '0,' so that the variation in input current per unit time is constantly maintained.

Referring to FIG. 6, when the output voltage of the AC power source 1 has the minimum value, the channel between the source and drain of the electronic switching element 12 is maximally opened, to be in the on state.

In order to increase the amount of opening of the channel by linearly opening the channel for allowing current to flow in the electronic switching element 12, the controller 20 controls the gate voltage for operating the electronic switching element 12 at the point of time when the AC power source 1 is applied to linearly increase from '0' and reach a threshold voltage (or critical voltage). Accordingly, as the channel between the source and drain of the electronic switching element (MOSFET) 12 is gradually opened, so that it is possible to control and reduce the inrush current instantaneously introduced from the AC power source 1.

In order to control the operation of the electronic switching element 12, the controller 20 includes an ordinary circuit (not shown) for linear operation of the electronic switching element 12.

In the charger 10, the control manner of the electronic switching element 12 is differentiated as described above according to the voltage section to which current voltage applied when external AC power source 1 is connected belongs (the low, intermediate, or high voltage section). However, the present disclosure is not limited thereto.

When the AC voltage applied to the charger 10 belongs to the low voltage section, a first manner of turning on the electronic switching element 12 by synchronizing the electronic switching element 12 with the AC power source 1 as shown in FIG. 4, a second manner of turning on/off the electronic switching element 12 in a high-speed switching manner through PWM control as shown in FIG. 5, and a third manner of gradually turning on the electronic switching element 12 in a linear control manner as shown in FIG. 6 are all applicable, and the operation of the electronic switching element 12 can be controlled in one manner selected from the first to third manners.

When the AC voltage applied to the charger 10 belongs to the intermediate and high voltage sections, the second manner (see FIG. 5) and the third manner (see FIG. 6) are applicable, and the operation of the electronic switching element 12 can be controlled in one manner selected from the two manners.

Each of the input filter 11, the rectifier 13, the PFC 14, and the DC/DC converter 15 as components of the charger 10 has a circuit configuration known in the art, and therefore, their detailed descriptions will be omitted.

For example, the input filter 11 may be an electromagnetic interference (EMI) filter configured with an inductor or/and a capacitor so as to eliminate noise of the AC voltage, and the rectifier 13 may be configured with a full-wave rectifying circuit including full-bridge diodes.

Here, a control method of the charging device for the eco-friendly vehicle according to the present disclosure, based on the above-described configuration, will be described as follows with reference to FIG. 7.

Figure 7:
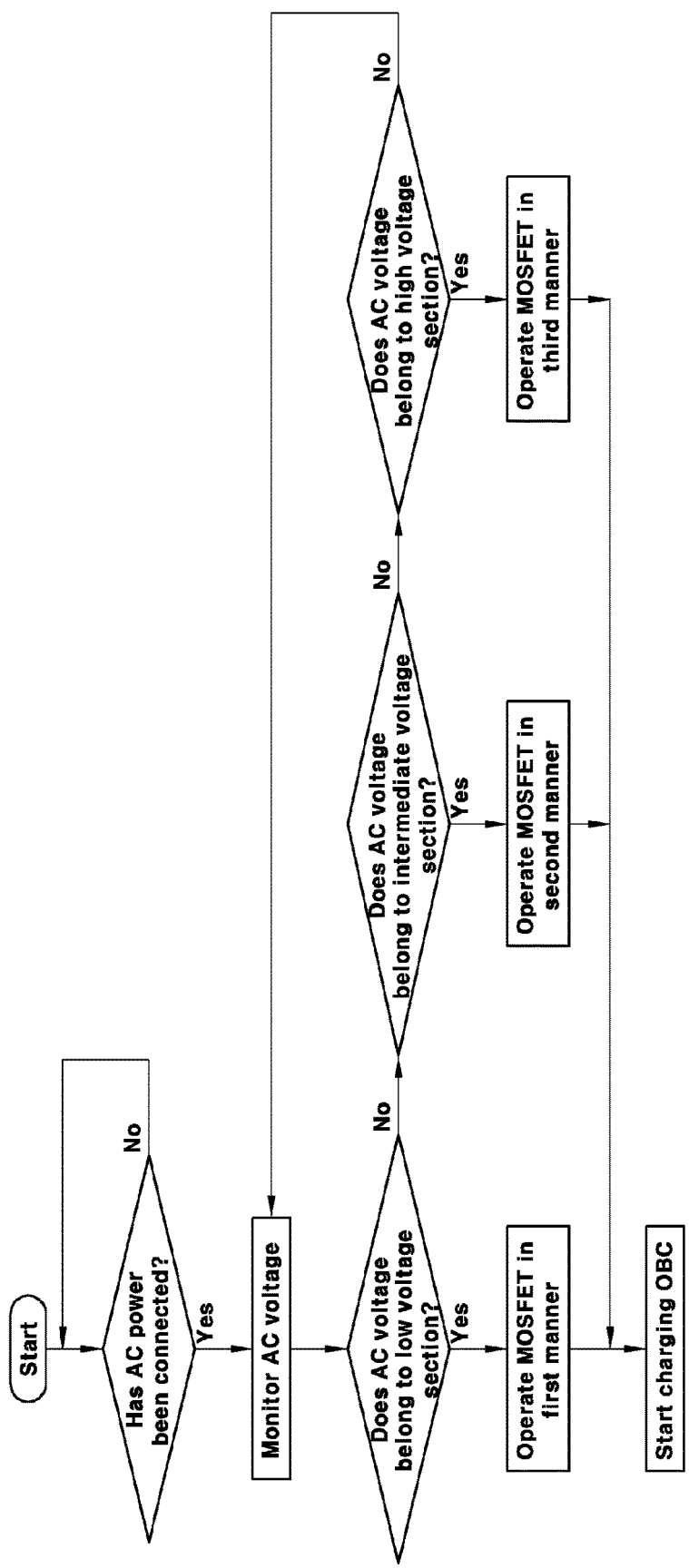
FIG. 7 is a flowchart illustrating a control method for connecting power to the charging device according to an embodiment in the present disclosure.

As shown in FIG. 7, first, it is determined whether the AC power 1 is connected to the input terminal of the vehicle mounted type charger 10 including the electronic switching element 12.

When it is determined that the AC power 1 outside the vehicle has been connected to the charger 10, the controller 20 monitors, in real time, an AC voltage applied from the AC power 1, and determines to (in) which voltage section among two or more voltage sections (low, intermediate, and high voltage sections) the monitored AC voltage belongs (is included), thereby optimally controlling the operation of the electronic switching element 12 in consideration of the voltage section to which the monitored AC voltage belongs.

In other words, the controller 20 controls the operation of the electronic switching element 12 by selectively applying a control manner for reducing an inrush current for each voltage section to which the monitored AC voltage belongs.

When the monitored AC voltage belongs to a relatively low voltage section, the operation of the electronic switching element 12 may be controlled in the first manner (see FIG. 4). When the monitored AC voltage belongs to a relatively intermediate voltage section, the operation of the electronic switching element 12 may be controlled in the second manner (see FIG. 5). When the monitored AC voltage belongs to a relatively high voltage section, the operation of the electronic switching element 12 may be controlled in the third manner (see FIG. 6).

As such, the operation of the electronic switching element 12 is controlled in a manner selected from the first to third manners so as to reduce excessive inrush current instantaneously introduced into the charger 10 at a point of time when the AC power 1 is connected/applied to the charger 10. Subsequently, if the electronic switching element 12 gets into an always-on state, the charger 10 starts substantial battery charging by outputting a voltage for charging the battery 2.

As described above, in the charging device of the present disclosure, before the substantial charging of the battery 2 starts in a state in which the external AC power 1 is connected to the charger 10, a voltage section is determined based on the magnitude of an AC voltage detected in real time, and the operation of the electronic switching element 12 is controlled in consideration of the determined voltage section, so that it is possible to reduce an inrush current introduced into the charger 10.

In addition, effects of the charging device for eco-friendly vehicle according to the present disclosure will be described as follows.

1. A power connector of the existing charger (OBC) having the resistance element and the mechanical relay, through which initial charging current flows in the application of AC power, includes a single component such as a MOSFET that is a semiconductor element, so that it is possible to simplify design and assembly processes. As the volume of the power connector is reduced, it is possible to increase the output density of the charging device and easily perform package design.

2. The operation of the electronic switching element can be actively controlled according to the wave form of AC power (AC voltage) input from the outside.

3. The MOSFET can be directly attached to a housing of the charger (OBC), so that it is possible to perform heat dissipation design, and any additional component for heat dissipation is unnecessary.

4. The power connector of the charger (OBC) includes an electronic switching element as a single component, so that it is possible to save power consumption and reduce resistance in an operation of the charger (OBC) as compared with the power connector of the charger (OBC), thereby improving the efficiency of the charger (OBC). Since the switching element is not operated mechanically but operated electronically, it is possible to increase the on/off control speed of the switching element and enhance durability life.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A charging device for charging a battery of an eco-friendly vehicle, the charging device comprising:
   a charger having an electronic switching element which reduces an excessive current instantaneously flowing when an external AC power source outside the vehicle is connected to the charger; and a controller configured to control an operation of the electronic switching element, wherein the controller monitors an AC voltage applied to the charger from the external AC power source when the external AC power source is connected to the charger by categorizing the AC voltage into previously set low, intermediate, and high voltage sections, and when the monitored AC voltage belongs to the high voltage section, the controller applies a gate voltage for allowing current to flow in the electronic switching element while increasing the gate voltage at a predetermined rate.

2. The charging device of claim 1, wherein the controllers turns on the electronic switching element at a point of time when the AC voltage becomes '0' when the monitored AC voltage belongs to the low voltage section.

3. The charging device of claim 1, wherein the controllers repeatedly turns on/off the electronic switching element for a predetermined time when the monitored AC voltage belongs to the low voltage section.

4. The charging device of claim 1, wherein the controller applies a gate voltage for allowing current to flow in the electronic switching element while increasing the gate voltage at a predetermined rate when the monitored AC voltage belongs to the low voltage section.

5. The charging device of claim 1, wherein the controller repeatedly turns on/off the electronic switching element for a predetermined time when the monitored AC voltage belongs to the intermediate voltage section.

6. The charging device of claim 1, wherein the controller applies a gate voltage for allowing current to flow in the electronic switching element while increasing the gate voltage at a predetermined rate when the monitored AC voltage belongs to the intermediate voltage section.

7. The charging device of claim 1, wherein the controller repeatedly turns on/off the electronic switching element and then controls the electronic switching element to be in an always-on state when the monitored AC voltage belongs to the intermediate voltage section.

8. The charging device of claim 1, wherein the charger includes a rectifier for rectifying the AC voltage applied from the external AC power source, and the electronic switching element is connected to an input terminal of the rectifier.

9. A charging device for charging a battery of an eco-friendly vehicle, the charging device comprising:

a charger having an electronic switching element which reduces an excessive current instantaneously flowing when an external AC power source outside the vehicle is connected to the charger; and a controller configured to control an operation of the electronic switching element, wherein the controller monitors an AC voltage applied to the charger from the external AC power source when the external AC power source is connected to the charger by categorizing the AC voltage into previously set low, intermediate, and high voltage sections, and, when the monitored AC voltage belongs to the high voltage section, the controller repeatedly turns on/off the electronic switching element for a predetermined time.

10. The charging device of claim 9, wherein the controller turns on the electronic switching element at a point of time when the AC voltage becomes '0' when the monitored AC voltage belongs to the low voltage section.

11. The charging device of claim 9, wherein the controller repeatedly turns on/off the electronic switching element for a predetermined time when the monitored AC voltage belongs to the low voltage section.

12. The charging device of claim 9, wherein the controller applies a gate voltage for allowing current to flow in the electronic switching element while increasing the gate voltage at a predetermined rate when the monitored AC voltage belongs to the low voltage section.

13. The charging device of claim 9, wherein the controller repeatedly turns on/off the electronic switching element for a predetermined time when the monitored AC voltage belongs to the intermediate voltage section.

14. The charging device of claim 9, wherein the controller applies a gate voltage for allowing current to flow in the electronic switching element while increasing the gate voltage at a predetermined rate when the monitored AC voltage belongs to the intermediate voltage section.

15. The charging device of claim 9, wherein the controller repeatedly turns on/off the electronic switching element and then controls the electronic switching element to be in an always-on state when the monitored AC voltage belongs to the intermediate voltage section.

16. A method of controlling a charging device for charging a battery of an eco-friendly vehicle, the method comprising:

determining whether an external AC power source is connected to a charger of the vehicle, which includes an electronic switching element for reducing an excessive current instantaneously flowing when the AC power source is connected to the charger;

monitoring an AC voltage applied to the charger from the AC power source; and monitoring the AC voltage applied from the AC power source by categorizing the AC voltage into previously set low, intermediate, and high voltage sections, and when the monitored AC voltage belongs to the intermediate voltage section, repeatedly turning on/off the electronic switching element for a predetermined time, and controlling an operation of the electronic switching element by considering a voltage section to which the monitored AC voltage belongs.

* * * * *